(No Model.)
L. J. MAGIE.
TYPE WRITING MACHINE.
No. 498,129. Patented May 23, 1893.
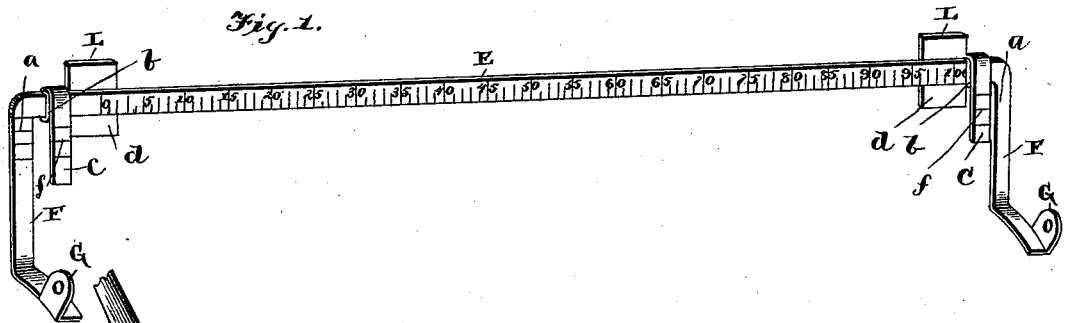
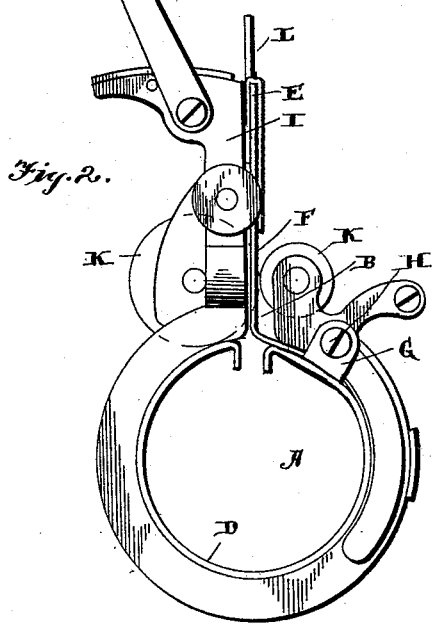
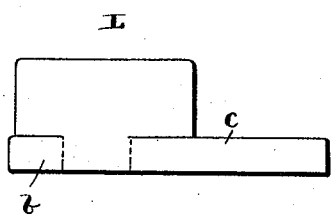
Witnesses
Geo. E. Frech
Roland A. Fitzgerald
Inventor
Lizzie J. Magie
per Pattison & Nesbit attys

UNITED STATES PATENT OFFICE.

LIZZIE J. MAGIE, OF WASHINGTON, DISTRICT OF COLUMBIA.

TYPE-WRITING MACHINE.

SPECIFICATION forming part of Letters Patent No. 498,129, dated May 23, 1893.

Application filed January 3, 1893. Serial No. 457,020. (No model.)

*To all whom it may concern:*

Be it known that I, LIZZIE J. MAGIE, of Washington, in the District of Columbia, have invented certain new and useful Improvements in Scales for Type-Writers; and I do hereby declare the following to be a full, clear, and exact description of the invention, such as will enable others skilled in the art to which it pertains to make and use it, reference being had to the accompanying drawings, which form part of this specification.

My invention relates to improvements in type-writing machines; and it consists in the construction and arrangement of parts which will be fully described hereinafter and particularly pointed out in the claims.

The object of my invention is to provide a scale for that class of type-writers known as the "Hammond" in which class of machines there is a circular paper holder or cylinder below the paper feeding rollers, the scale being constructed and so attached to the frame of the carriage of the machine as to be read and operated in a manner similar to the Remington and similar type of machines.

The object of my invention further consists in providing the scale with movable clamps or holders which can be moved along the scale to any desired point from opposite ends thereof to clasp and hold the sheet of paper being written upon after it has passed above the rollers, which latter are in the Hammond type of machines considerably below the printing point, so that the paper cannot be written upon any nearer its lower edge than the distance between the engaging edges of the rollers and the printing point, and this in some instances is very inconvenient. By the use of these movable holders, the paper is held and clasped in a straight position until it is drawn entirely past the printing point, since the scale is above that point, thus enabling the operator to write upon the entire sheet, a result not now possible in the Hammond type of machine.

The object of my invention also consists in providing the vertical or side portions of the scale with horizontal lines indicating the distance between the lines so that after the sheet has left the rollers it can be drawn upward and placed in a position proper to bring the lines the same distance apart and exactly parallel with the previously written lines on the sheet, and for this same purpose the holders are provided with depending portions having lines corresponding with the side lines on the scale; and I also provide the scale with marginal lines at one end thereof, so that any desired margin can be left upon the paper.

In the accompanying drawings:—Figure 1 is a perspective view of my scale detached from the machine. Fig. 2 is an end view of the paper holding cylinder of a Hammond machine, my scale being shown in position thereon. Fig. 3 is a detached view of one of the movable holders, the same being shown opened out in blank form before being bent to be applied to the scale.

A indicates the end frame of the cylinder of a Hammond machine, which is made in circular form as clearly shown, a space being left as shown at B at the upper portion thereof to allow the insertion of the paper to be printed upon. Placed within this circular portion A is a sheet metal portion D, the upper ends of which are separated to form an opening registering with the opening left in the portion A. The object of this construction, is well known to those skilled in the art to be to allow sheets of any desired width to be placed in the carriage, and need not be further referred to by me.

My invention consists of a scale having a horizontal portion E, with the usual indicating lines for the space occupied by the letters being printed. Depending from opposite ends of this horizontal portion are the arms F, which preferably have their lower ends bent as shown and provided with ears G, at their outer edges, which ears are perforated for the insertion of a screw H which is found upon all the Hammond machines. These arms are placed between the sheet metal portion of the carriage and the frame A as clearly shown in Fig. 2, thus bringing the horizontal scale E above the printing point in identically the same relation to the printing for indicating the point thereon, as the Remington scale, except that in this instance the scale is above the line being printed instead of below as in the Remington. However, as will be readily understood, it is used in the same manner.

While I here show the ends of the arms slightly bent to correspond with the circular portion A and the sheet metal portion D, I do not limit myself to this construction, for it will be readily understood that the scale may be made with the arms straight and of a thin metal which will readily admit of being bent into the proper form by the person applying it, or of thin spring material which will spring sufficient to be placed between the sheet metal portion D and the portion A. So also while I prefer to provide the arms A with the ears so that it can be attached to the frame by a screw, this I also find not necessary for the spring of the sheet metal portion D will hold it in place by its clamping action with the portion A.

It will be noticed that the main object aimed at is to have the scale supported by the inner side of the portion A, to the inner side of the opening B, so that the sheet can pass behind it and not interfere with putting sheets of all widths in the machine just the same, and to have the horizontal portion of the scale in a vertical line between the bearings of the rollers, whereby it allows the sheet to extend between it and the rear vertical portion I of the carriage.

Attention is called to the fact that the scale is considerably above the rollers K which feed the paper, and in this class of machines the said rollers are considerably below the printing point. Owing to this fact the sheet cannot be written upon any nearer its lower edge than the distance between the engaging edges of the rollers and the printing point as will be clearly understood.

In order to enable the paper to be held independent of the rollers and by the scale after it has passed above the rollers, the horizontal portion of the scale normally rests against the vertical portion I, thus holding the paper sufficiently to be written upon after it leaves the said feed rollers.

For the purpose of enabling the paper to be moved the proper distance after leaving the rollers to bring the lines the desired distance above the lines previously printed, I provide the arms of the scale with horizontal lines $a$, by means of which the paper can be moved the desired distance by gaging the last line written with these side lines at each end of the sheet.

In order to enable the paper to be drawn up straight after leaving the rollers, I provide the horizontal portion of the scale with the movable holders L, which are shaped as shown in Fig. 3. The arm $b$, in Fig. 3 is bent around the horizontal portion of the scale, and the portion $c$ around over the front as shown leaving the flat and largest portion $d$, behind the scale as clearly shown, and held in contact therewith. The paper is placed between these flat portions and the scale. The front portions $c$ are provided with horizontal lines $f$, to indicate the distance of the lines apart for the same purpose that the lines $a$ are placed upon the arms of the scale. So also these holders are very convenient when it is desired to write upon a very narrow sheet of paper, for it is firmly held by the holders which can be moved to any part of the scale to hold it in any desired position upon the carriage. The main purpose of the scale however is to provide a convenient one for the Hammond type of machines.

I do not limit myself to any particular construction of the scale, but my invention resides in the fact of supporting a scale by the portion A in front of the vertical portion I, so that paper can be placed between it and the vertical portion, no matter how the scale may be attached, whether by means of arms, or whether permanently or detachably connected, so long as it is in this relation, that is to say, supported by the portion A in front of the portion I, and extending from the portion A in rear of the opening B, and above the printing cylinder of the machine. In this position the scale is found to be very convenient, and to answer all the purposes for which such scales are provided in other type writing machines, and so far as I am aware there is not now any such contrivance for the said type of type writing machines.

Having thus described my invention, what I claim, and desire to secure by Letters Patent, is—

1. The combination with a type writer carriage having a cylindrical paper holder, the cylindrical holder having a longitudinal opening in its top of a scale attached to the said cylindrical holder at the inner side of the said slot and projecting upward and provided with a horizontal graduated portion, substantially as and for the purpose described.

2. The combination with the carriage of a Hammond type writer of a scale attached thereto inside of the longitudinal slot in said carriage, the scale having a horizontal graduated portion, and depending arms attached to the said carriage at the above point, substantially as and for the purpose specified.

3. The combination with the carriage of a type writer having a longitudinal slot, of a scale provided with a horizontal portion having depending arms at each end, the said arms being bent inward when attached to the said carriage, and attached thereto inside of the said slot, substantially as described.

4. The combination with a type writer carriage having a vertical slot, of a scale having a horizontal portion with depending arms at opposite ends thereof, the said arms provided with laterally extending perforated ears through which clamping screws pass, substantially as shown.

5. The combination with a scale having a graduated horizontal portion, of a movable holder placed upon the said horizontal portion, the holder having a projecting portion to hold the paper, substantially as specified.

6. A type writer scale having a horizontal portion provided with graduations, in combination with a movable holder placed upon the said horizontal portion having a projecting lip or portion for engaging the paper to be printed upon, and horizontal graduations to represent the distance between the lines of printing, substantially as described.

7. The combination with a type writer scale having a horizontal graduated portion, of two movable holders placed upon the said horizontal portion, and having each projecting portions for holding the paper to be printed upon, substantially as set forth.

In testimony whereof I affix my signature in presence of two witnesses.

LIZZIE J. MAGIE.

Witnesses:
A. S. PATTISON,
JAMES K. MAGIE.